(12) United States Patent
Yamamura

(10) Patent No.: US 10,714,799 B2
(45) Date of Patent: Jul. 14, 2020

(54) FUEL-CELL VEHICLE

(71) Applicant: TOYOTA JIDOSHA KABUSHIKI KAISHA, Toyota-shi, Aichi-ken (JP)

(72) Inventor: Kotaro Yamamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/058,477

(22) Filed: Aug. 8, 2018

(65) Prior Publication Data

US 2019/0123406 A1 Apr. 25, 2019

(30) Foreign Application Priority Data

Oct. 23, 2017 (JP) .................. 2017-204791

(51) Int. Cl.
| | |
|---|---|
| *H01M 10/66* | (2014.01) |
| *H01M 16/00* | (2006.01) |
| *H01M 8/0432* | (2016.01) |
| *H01M 10/625* | (2014.01) |
| *H01M 10/6568* | (2014.01) |
| *B60L 58/26* | (2019.01) |
| *H01M 8/04746* | (2016.01) |

(Continued)

(52) U.S. Cl.
CPC ............. *H01M 10/66* (2015.04); *B60L 58/26* (2019.02); *B60L 58/33* (2019.02); *H01M 8/04007* (2013.01); *H01M 8/04029* (2013.01); *H01M 8/04074* (2013.01); *H01M 8/04358* (2013.01); *H01M 8/04723* (2013.01); *H01M 8/04768* (2013.01); *H01M 10/486* (2013.01); *H01M 10/613* (2015.04); *H01M 10/615* (2015.04); *H01M 10/625* (2015.04); *H01M 10/63* (2015.04); *H01M 10/633* (2015.04); *H01M 10/6568* (2015.04); *H01M 16/006* (2013.01); *B60Y 2200/91* (2013.01); *H01M 2220/20* (2013.01); *H01M 2250/20* (2013.01)

(58) Field of Classification Search
CPC .................................................... H01M 10/66
See application file for complete search history.

(56) References Cited

U.S. PATENT DOCUMENTS

2011/0214930 A1* 9/2011 Betts .................. H01M 8/0662
180/65.1
2017/0365901 A1* 12/2017 Hiramitsu ........... H01M 8/0432

FOREIGN PATENT DOCUMENTS

| JP | H10-3951 A | 1/1998 |
|---|---|---|
| JP | 2010-233283 A | 10/2010 |

(Continued)

*Primary Examiner* — Maria Laios
(74) *Attorney, Agent, or Firm* — Hunton Andrews Kurth LLP

(57) ABSTRACT

A fuel-cell vehicle includes a fuel cell and a secondary battery. A circulation flow passage causes a coolant to circulate between the fuel cell and a radiator. A bypass flow passage passes through the secondary battery. One end of the bypass flow passage is connected to an upstream side of the radiator and the other end thereof is connected to a downstream side of the radiator of the circulation flow passage. A controller switches a switching valve such that the coolant flows to the radiator side when a coolant temperature is higher than a predetermined temperature threshold value, and switches the switching valve such that the coolant flows to the bypass flow passage side when the coolant temperature is lower than the temperature threshold value.

1 Claim, 4 Drawing Sheets

(51) Int. Cl.
*H01M 10/633* (2014.01)
*H01M 10/615* (2014.01)
*H01M 8/04007* (2016.01)
*B60L 58/33* (2019.01)
*H01M 10/613* (2014.01)
*H01M 10/63* (2014.01)
*H01M 8/04029* (2016.01)
*H01M 8/04701* (2016.01)
*H01M 10/48* (2006.01)

(56) References Cited

FOREIGN PATENT DOCUMENTS

| | | |
|---|---|---|
| JP | 2011-014429 A | 1/2011 |
| JP | 2017-098152 A | 6/2017 |

* cited by examiner

FUEL-CELL VEHICLE

INCORPORATION BY REFERENCE

The disclosure of Japanese Patent Application No. 2017-204791 filed on Oct. 23, 2017 including the specification, drawings and abstract is incorporated herein by reference in its entirety.

BACKGROUND

1. Technical Field

The present disclosure relates to a fuel-cell vehicle including a fuel cell and a secondary battery.

2. Description of Related Art

Fuel-cell vehicles often use a combination of a fuel cell and a secondary battery as a power source of a traveling motor. The secondary battery serves as a complement to the fuel cell which has a delay in response. When the output power of the fuel cell is short, the secondary battery covers the shortage. When the state of charge of the secondary battery decreases, the secondary battery is charged with electric power from the fuel cell. The secondary battery may store electric power generated by the motor.

A technique of using a cooling system of a fuel cell to control the temperature of a secondary battery is disclosed, for example, in Japanese Unexamined Patent Application Publication No. 10-3951 (JP 10-3951 A). When the temperature is excessively low, performance of the secondary battery decreases. In a fuel-cell vehicle disclosed in JP 10-3951 A, a coolant is circulated from the cooling system of the fuel cell to the secondary battery when an ignition switch of the vehicle is switched off, and circulation of the coolant is stopped when the temperature of the secondary battery is higher than a predetermined temperature threshold value. By circulating the heated coolant to the secondary battery, a temperature of the secondary battery may decreases slowly after the ignition switch has been switched off. Accordingly, the temperature of the secondary battery can be set to be as high as possible when the next time the ignition switch is switched on.

The technique disclosed in JP 10-3951 A is a technique of slowing down a temperature decrease of the secondary battery after the ignition switch has been turned off. It is preferable to prevent the temperature of the secondary battery from decreasing by using the cooling system of the fuel cell even when the ignition switch is turned on.

SUMMARY

A fuel-cell vehicle in an aspect of the disclosure includes a fuel cell, a secondary battery, a radiator, a circulation flow passage, a bypass flow passage, a switching valve, a temperature sensor and a controller. The circulation flow passage is configured to cause a coolant to circulate between the fuel cell and the radiator. The bypass flow passage passes through the secondary battery. One end of the bypass flow passage is connected to the circulation flow passage on an upstream side of the radiator. The other end of the bypass flow passage is connected to the circulation flow passage on a downstream side of the radiator. The switching valve is configured to switch a direction in which the coolant flows between a radiator side and a bypass flow passage side. The switching valve is provided at a junction between the circulation flow passage and the bypass flow passage on an upstream side of the radiator. The temperature sensor is configured to measure a temperature of a coolant passed through the fuel cell. The controller is configured to switch the switching valve to the radiator side when the temperature of the coolant is higher than a predetermined temperature threshold value. The controller is configured to switch the switching valve to the bypass flow passage side when the temperature of the coolant is lower than the predetermined temperature threshold value.

A fuel-cell vehicle in another aspect of the disclosure includes a fuel cell, a secondary battery, a radiator, a circulation flow passage, a bypass flow passage, a switching valve, a first temperature sensor, a second temperature sensor and a controller. The circulation flow passage is configured to cause a coolant to circulate between the fuel cell and the radiator. The bypass flow passage passes through the secondary battery. One end of the bypass flow passage is connected to the circulation flow passage on an upstream side of the radiator. The other end of the bypass flow passage is connected to the circulation flow passage on a downstream side of the radiator. The switching valve is configured to switch a direction in which the coolant flows between a radiator side and a bypass flow passage side. The switching valve is provided at a junction between the circulation flow passage and the bypass flow passage on the upstream side of the radiator. The first temperature sensor is configured to measure a coolant temperature. The coolant temperature is a temperature of a coolant passed through the fuel cell. The second temperature sensor is configured to measure a secondary battery temperature. The secondary battery temperature is a temperature of the secondary battery. The controller is configured to switch the switching valve to the bypass flow passage side when the following condition i) is satisfied. The controller is configured to switch the switching valve to the radiator side when the following condition i) is not satisfied. The condition i) is that the coolant temperature is lower than a predetermined temperature threshold value and the coolant temperature is higher than the secondary battery temperature.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
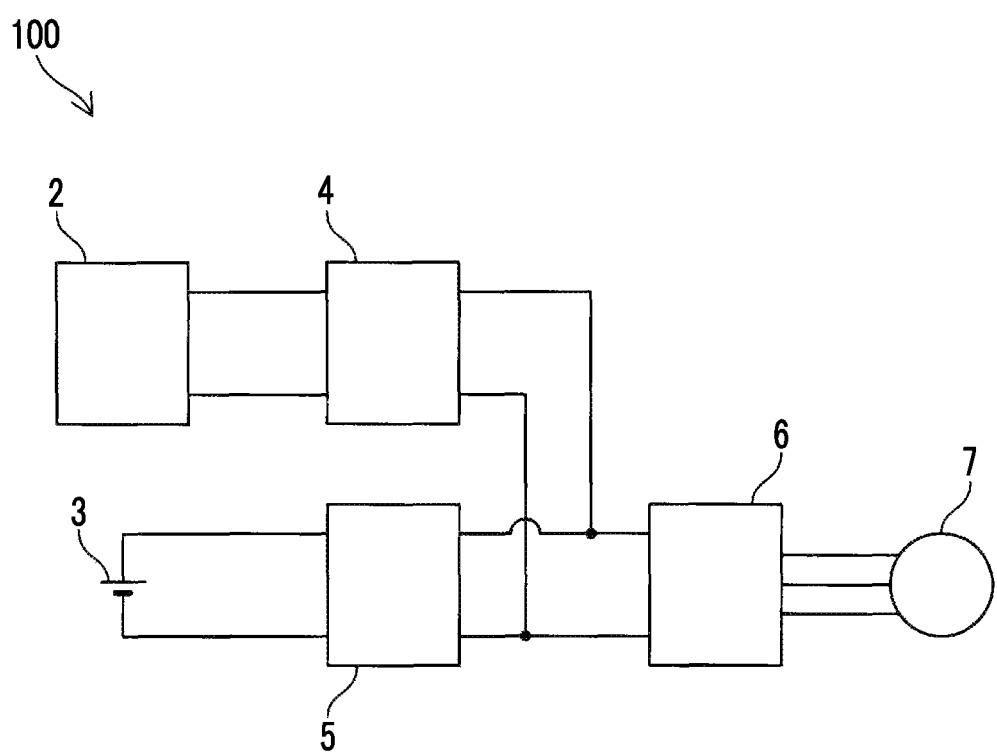
FIG. 1 is a block diagram of a fuel-cell vehicle according to an embodiment.

A fuel-cell vehicle according to a first embodiment will be described below with reference to the accompanying drawings. FIG. 1 illustrates a block diagram of a power system of a fuel-cell vehicle 100. The fuel-cell vehicle 100 according to the embodiment includes a fuel cell 2, a battery 3, a first converter 4, a second converter 5, an inverter 6, and a traveling motor 7. Both the fuel cell 2 and the battery 3 serve as a power source for driving the traveling motor 7. The first converter 4 and the second converter 5 are voltage converters. A low voltage side of the first converter 4 is connected to the fuel cell 2, and a high voltage side of the first converter 4 is connected to a DC side of the inverter 6. A low voltage side of the second converter 5 is connected to the battery 3, and a high voltage side thereof is connected to the DC side of the inverter 6. The traveling motor 7 is connected to an AC side of the inverter 6.

The first converter 4 steps up a voltage of electric power output from the fuel cell 2. The second converter 5 has a step-up function of stepping up an output voltage of the battery 3 and supplying the stepped-up voltage to the inverter 6, and a step-down function of stepping down a voltage of electric power (regenerative power which will be described later) sent from the inverter 6 and supplying the stepped-down voltage to the battery 3. That is, the second converter is a bidirectional DC-DC converter. The second converter 5 may step down a voltage of surplus power of the fuel cell 2 and supply the stepped-down voltage to the battery 3.

The inverter 6 converts stepped-up DC power of the fuel cell 2 or stepped-up DC power of the battery 3 into AC power which is suitable for driving the motor 7. The motor 7 is driven with the AC power supplied from the inverter 6. The motor 7 may generate electric power using kinetic energy of the vehicle. Electric power generated by the motor 7 is referred to as regenerative power. The inverter 6 may convert regenerative power which is AC power generated by the motor 7 into DC power and supply the DC power to the second converter 5.

The output power required for the motor 7 frequently varies depending on a driver's accelerator work. On the other hand, the fuel cell 2 has a large time constant for adjustment of the output power. The fuel-cell vehicle 100 has the battery 3 mounted therein to compensate for a response delay of the fuel cell 2. The battery 3 is, for example, a secondary battery such as a lithium ion battery. The secondary battery is a rechargeable battery. The fuel-cell vehicle 100 covers a shortage with the electric power of the battery 3 when the output power of the fuel cell 2 does not reach a target output power of the motor 7. When the output power of the fuel cell 2 is greater than the target output power of the motor 7, the battery 3 is charged with surplus power of the fuel cell 2. In this case, a part of the output power of the first converter 4 is supplied to the inverter 6, and the remaining part of the output power of the first converter 4 is stepped down by the second converter and supplied to the battery 3.

Figure 2:
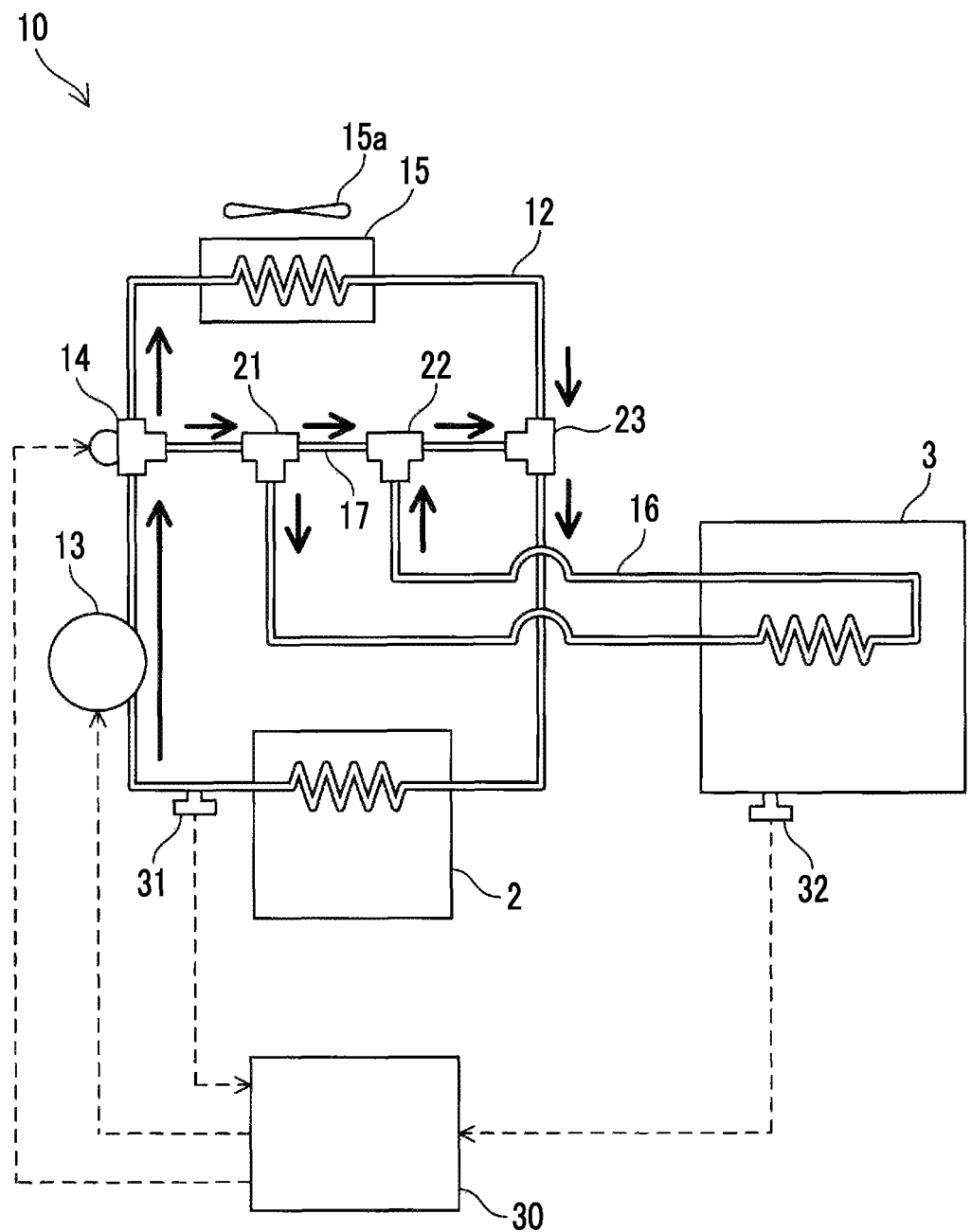
FIG. 2 is a block diagram of a cooling system.

The fuel-cell vehicle 100 includes a cooling system 10 that cools the fuel cell 2. The cooling system 10 is used to cool the fuel cell 2 and is also used to adjust the temperature of the battery 3. FIG. 2 illustrates a block diagram of the cooling system 10. The cooling system 10 includes a radiator 15, a circulation flow passage 12, a pump 13 that feeds a coolant, and a controller 30. The circulation flow passage 12 circulates a coolant between the radiator 15 and the fuel cell 2. The pump 13 feeds a coolant flowing out of the fuel cell 2 to the radiator 15. The radiator 15 includes a fan 15*a*, and the coolant dissipates heat to air fed by the fan 15*a* to decrease the temperature of the coolant. The coolant of which the temperature has decreased is sent again to the fuel cell 2 by the circulation flow passage 12 to cool the fuel cell 2. The coolant is a liquid and is typically water or a long-life coolant (LLC). A solid arrow in FIG. 2 indicates a flow direction of the coolant and a dotted line indicates a signal line. In the following description, for the purpose of simplification of description, an upstream side of a coolant flow (a downstream side of a coolant flow) may be referred to as a coolant flow upstream side (a coolant flow downstream side) or may be simply referred to as an upstream side (a downstream side).

A bypass flow passage 16 that causes a coolant to bypass the radiator 15 is connected to the circulation flow passage 12. One end of the bypass flow passage 16 is connected to the circulation flow passage 12 on an upstream side of the radiator 15, and the other end of the bypass flow passage 16 is connected to the circulation flow passage 12 on a downstream side of the radiator 15. The bypass flow passage 16 passes through the battery 3. The "bypass flow passage 16 passes through the battery 3" means that the bypass flow passage 16 passes through a housing of the battery 3. The bypass flow passage 16 is a flow passage that guides a coolant to the battery 3 to adjust the temperature of the battery 3.

A switching valve 14 is provided at a junction between the circulation flow passage 12 and the bypass flow passage 16 on an upstream side of the radiator 15. The switching valve 14 switches a flow direction of a coolant flows out of the fuel cell 2 between the radiator 15 side and the bypass flow passage 16 side. The switching valve 14 is controlled by the controller 30. Control of the switching valve 14 will be described later.

Three junctions 21, 22, and 23 are provided in the middle of the bypass flow passage 16. The junction 23 corresponds to a downstream end of the bypass flow passage 16, and the bypass flow passage 16 joins the circulation flow passage 12 at the junction 23. Two junctions 21 and 22 are provided in the bypass flow passage 16. The junction 21 divides a coolant into a flow passage directed to the battery 3 and a shortcut flow passage 17. The junction 22 is provided downstream from the shortcut flow passage 17. A coolant flowing through the shortcut flow passage 17 and a coolant passed through the battery 3 join at the junction 22 and flow to a downstream end of the bypass flow passage 16. The junctions 21 and 22 and the shortcut flow passage 17 are provided to adjust an amount of coolant flowing in the battery 3. When the same amount of coolant as an amount of coolant flowing in the circulation flow passage 12 may flow in the battery 3, the junctions 21 and 22 and the shortcut flow passage 17 are not necessary.

The cooling system 10 includes two temperature sensors 31 and 32. The first temperature sensor 31 is provided at a downstream side of the fuel cell 2 of the circulation flow passage 12 and measures the temperature of a coolant passed through the fuel cell 2. The first temperature sensor 31 is provided at a fuel cell outlet or near the fuel cell outlet of the circulation flow passage 12. The second temperature sensor 32 is provided in the battery 3 and measures the temperature of the battery 3.

Figure 3:
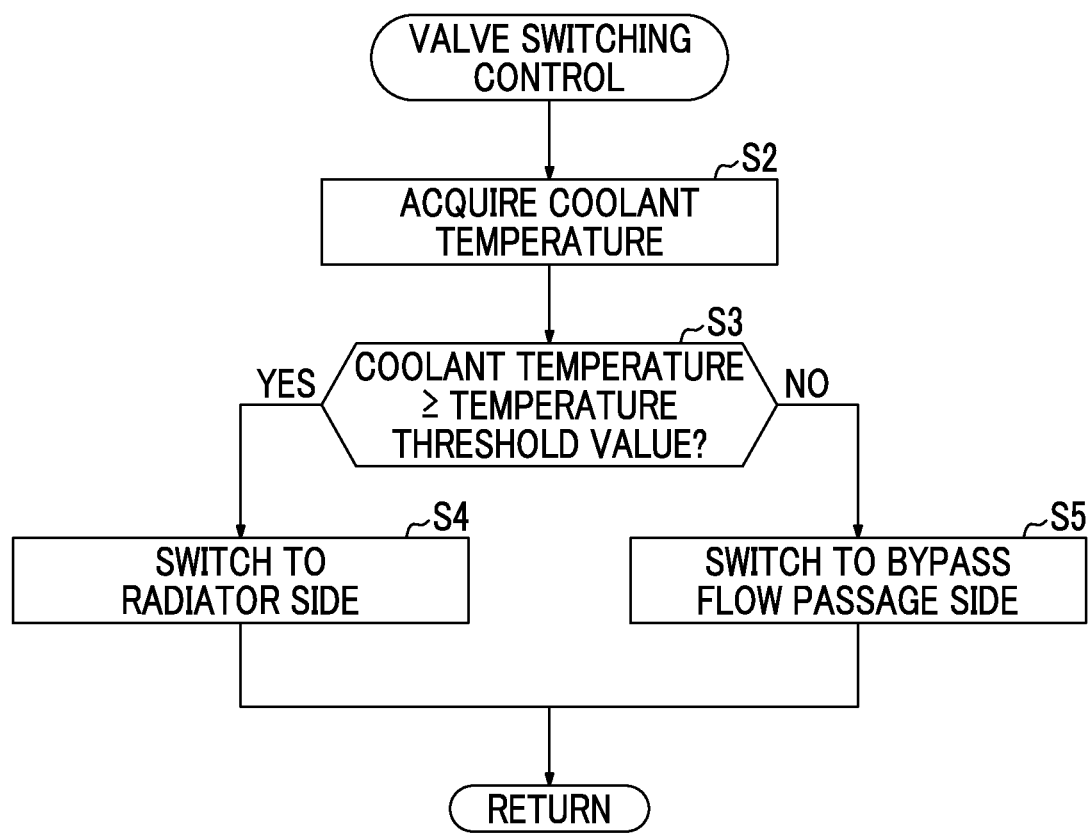
FIG. 3 is a flowchart illustrating valve switching control which is performed by a controller in a first embodiment.

Performance of the battery 3 decreases at a low temperature. The fuel-cell vehicle 100 can heat the battery 3 using the cooling system 10 for cooling the fuel cell 2. When a predetermined condition is satisfied, the controller 30 switches the switching valve 14 from the radiator side to the bypass flow passage side such that a coolant flows in the bypass flow passage 16. A flowchart of valve switching control which is performed by the controller 30 is illustrated in FIG. 3.

The controller 30 first acquires a coolant temperature from the first temperature sensor 31 (Step S2). As described above, the temperature which is measured by the first temperature sensor 31 is the temperature of a coolant (a coolant temperature) passed through the fuel cell 2. Then, the controller 30 compares the acquired coolant temperature with a temperature threshold value (Step S3). The temperature threshold value is set, for example, within a temperature range in which the battery 3 can operates normally. The temperature threshold value is set to, for example, 60° C. When the coolant temperature is higher than the temperature threshold value, the controller 30 switches the switching valve 14 to the radiator side such that a coolant flows in the radiator 15 (YES in Step S3 and Step S4). At the same time, the controller 30 operates the fan 15a of the radiator. When the coolant temperature is higher than the temperature threshold value, a coolant is sent to the radiator 15 to decrease the temperature of the coolant. The coolant of which the temperature has decreased is sent to the fuel cell 2 via the circulation flow passage 12. The fuel cell 2 is cooled by the coolant of which the temperature has decreased. In general, the fuel cell 2 and the battery 3 are used at the same time. Accordingly, when the coolant temperature measured by the first temperature sensor 31 is higher than the temperature threshold value, the temperature of the battery 3 will not be low and thus it is not necessary to heat the battery 3. The coolant temperature measured by the first temperature sensor 31 may think as an estimated value of the temperature of the fuel cell 2. In this case, the switching valve 14 is switched to the radiator side and the cooling system 10 cools the fuel cell 2. Although not illustrated, a temperature sensor is also provided in the fuel cell 2 and the controller 30 controls the pump 13 such that the temperature of the fuel cell 2 is maintained within a predetermined range suitable for operation.

On the other hand, when the coolant temperature measured by the first temperature sensor 31 is lower than the temperature threshold value, the controller 30 switches the switching valve 14 to the bypass flow passage side such that a coolant flows in the battery 3 (NO in Step S3 and Step S5). The controller 30 periodically repeats the processes of the flowchart illustrated in FIG. 3. When the coolant temperature (an estimated value of the temperature of the fuel cell 2) is low, the temperature of the battery 3 will be low. In this case, the battery 3 can be heated by the coolant by sending the coolant to the battery 3.

A fuel-cell vehicle according to a second embodiment will be described next. The structure of the fuel-cell vehicle according to the second embodiment is the same as that of the fuel-cell vehicle according to the first embodiment. Therefore, FIGS. 1 and 2 are used for the fuel-cell vehicle according to the second embodiment. FIGS. 1 and 2 have been described above and thus description of the hardware of the fuel-cell vehicle according to the second embodiment will be omitted.

Figure 4:
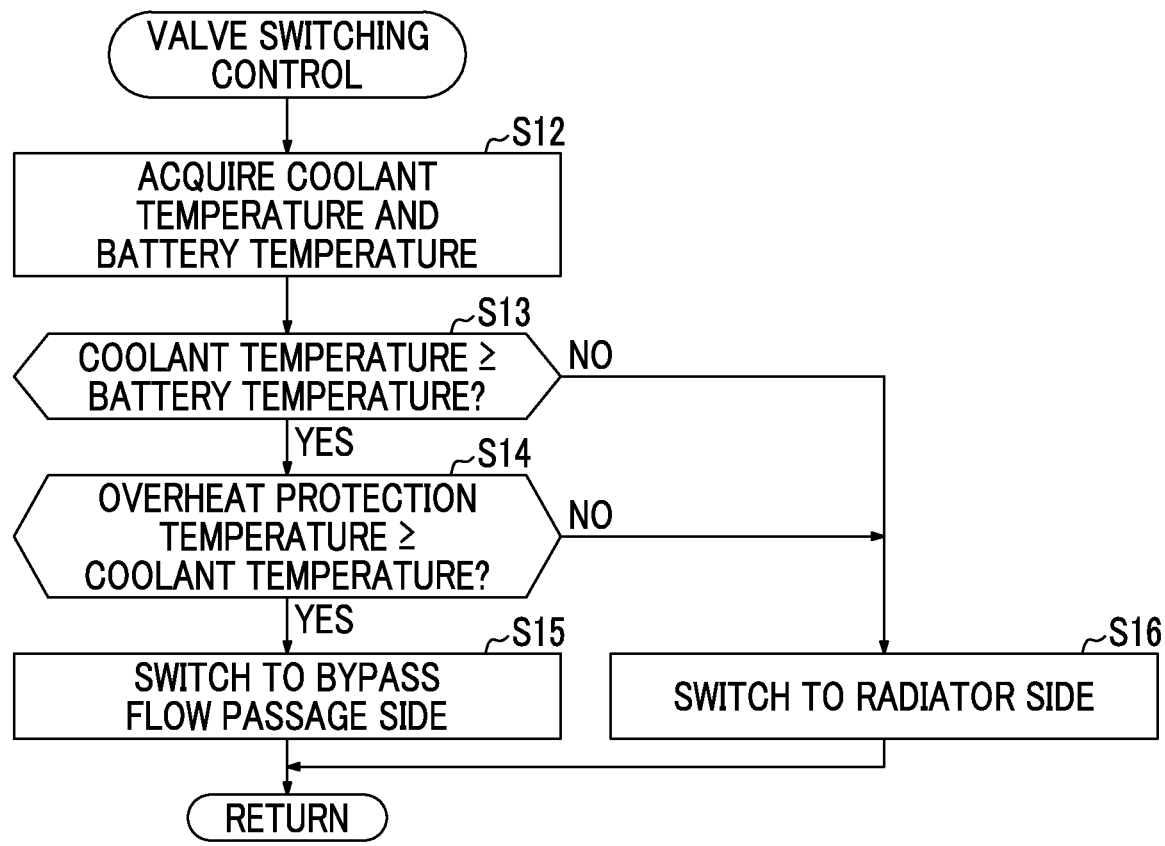
FIG. 4 is a flowchart illustrating valve switching control which is performed by a controller in a second embodiment.

In the fuel-cell vehicle according to the second embodiment, valve switching control which is performed by the controller 30 is different from that in the first embodiment. FIG. 4 illustrates a flowchart of valve switching control which is performed by the controller 30 according to the second embodiment. First, the controller 30 acquires the temperature of a coolant from the first temperature sensor 31 and acquires the temperature of the battery 3 from the second temperature sensor 32 (Step S12). The temperature of the coolant is the temperature of a coolant passed through the fuel cell 2 similarly to the first embodiment. In the following description, the temperature measured by the first temperature sensor 31 is referred to as a coolant temperature and the temperature measured by the second temperature sensor 32 is referred to as a battery temperature.

Then, the controller 30 compares the coolant temperature with the battery temperature (Step S13). When the coolant temperature is lower than the battery temperature, the battery 3 cannot be heated by the coolant and thus the switching valve 14 is switched to the radiator side such that the coolant does not flow in the bypass flow passage 16 (NO in Step S13 and Step S16). When the temperature of the battery 3 is low, that the temperature of the fuel cell 2 will not be so high as to require cooling and thus the controller 30 stops the fan 15a of the radiator. When the temperature of the fuel cell 2 is lower than a predetermined temperature, the controller 30 stops the pump 13.

On the other hand, when the coolant temperature is higher than the battery temperature, the controller 30 compares the coolant temperature with an overheat protection temperature (YES in Step S13 and Step S14). When the coolant temperature became higher than the overheat protection temperature, the performance of the battery may decrease. When the coolant temperature is higher than the overheat protection temperature and the coolant with such a high temperature flows in the battery 3, the temperature of the battery 3 may increase excessively. Therefore, when the coolant temperature is higher than the overheat protection temperature, the controller 30 switches the switching valve 14 to the radiator side such that the coolant passes through the radiator 15 (NO in Step S14 and Step S16). When the coolant temperature is lower than the overheat protection temperature, the controller 30 switches the switching valve 14 to the bypass flow passage side such that the coolant flows into the battery 3 (YES in Step S14 and Step S15). The controller 30 periodically repeatedly performs the processes illustrated in FIG. 4. When the determination results of both Steps S13 and S14 are YES the coolant temperature is higher than the battery temperature and the coolant temperature is lower than the overheat protection temperature. The coolant temperature in such a temperature range is suitable for maintaining the battery 3 in an appropriate temperature range.

In the fuel-cell vehicles according to the first embodiment and the second embodiment, the battery 3 can be adjusted to an appropriate temperature range using the cooling system 10 of the fuel cell 2. The process flow according to the first embodiment (FIG. 3) and the process flow according to the second embodiment (FIG. 4) are performed when the ignition switches of the vehicles are turned on. The fuel-cell vehicles according to the embodiments can heat the battery 3 when the ignition switches of the vehicles are turned on and a predetermined condition is satisfied.

Figure 5:
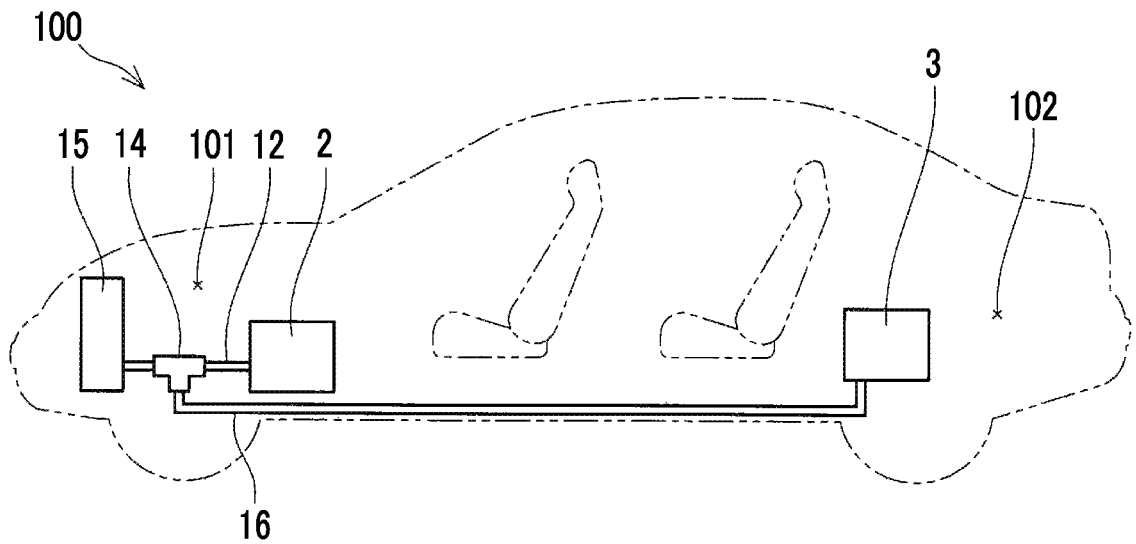
FIG. 5 is a diagram illustrating a layout of a fuel cell, a battery, and a bypass flow passage.

A layout of the fuel cell 2, the battery 3, and the flow passages will be described below. FIG. 5 illustrates the layout. In FIG. 5, a vehicle outline of the fuel-cell vehicle 100 is drawn by a virtual line. The radiator 15, the fuel cell 2, and the circulation flow passage 12 are mounted in a front compartment 101 of the vehicle. On the other hand, the battery 3 is mounted in a rear compartment 102 of the vehicle. The bypass flow passage 16 extends from the front compartment 101 to the rear compartment 102 through the lower part of a passenger compartment. In other words, the bypass flow passage 16 is a flow passage for causing the flow passage (the circulation flow passage 12) of the cooling system for the fuel cell 2 mounted in the front compartment 101 to extend to the battery 3 mounted in the rear compartment 102.

Points of the technique described in the embodiments to take note of will be described below. The technique disclosed in this specification is a technique for heating the battery 3 when the temperature of the battery 3 is low. The fuel-cell vehicle may include another cooler that cools the battery 3 in order to prevent overheating of the battery 3.

As described above, the technique described in the embodiments is a technique for heating the battery 3 using the cooling system 10 for the fuel cell 2. The controller 30 adjusts the output of the pump 13 depending on the temperature of the fuel cell 2 and maintains the temperature of the fuel cell 2 in an appropriate temperature range. When the temperature of the fuel cell 2 is lower than a temperature which is suitable for operation, the pump 13 and the fan 15a may be stopped. Alternatively, when the coolant temperature is higher than the temperature of the fuel cell 2, the controller 30 may stop the fan 15a and operate the pump 13. In this case, it is possible to heat the fuel cell 2 using the coolant with a temperature higher than the temperature of the fuel cell 2.

The signs of inequality in Step S3 in FIG. 3 and Steps S13 and S14 in FIG. 4 include the case of equality, but signs of inequality not including the case of equality may be used.

The configuration of the fuel-cell vehicle disclosed in this specification will be described below along with advantageous effects thereof. The fuel-cell vehicle includes a fuel cell and a secondary battery. The fuel-cell vehicle further includes a circulation flow passage, a bypass flow passage, a switching valve, a temperature sensor, and a controller. The circulation flow passage allows a coolant to circulate between the fuel cell and the radiator. One end of the bypass flow passage is connected to the circulation flow passage on the upstream side of a coolant flow of the radiator and the other end thereof is connected to the circulation flow passage on the downstream side of the coolant flow of the radiator. In other words, the bypass flow passage is a flow passage for causing the coolant to bypass the radiator. The bypass flow passage passes through the secondary battery. "Passing through the secondary battery" means that the passage passes through a housing of the secondary battery for the purpose of adjustment of temperature of the secondary battery. The switching valve is provided at a junction between the circulation flow passage and the bypass flow passage on the upstream side of the coolant flow of the radiator, and switches the flow direction of the coolant between the radiator side and the bypass flow passage side. The temperature sensor measures the temperature of the coolant (the coolant temperature) passed through the fuel cell. The controller switches the switching valve to the radiator side when the coolant temperature is higher than a predetermined temperature threshold value, and switches the switching valve to the bypass flow passage when the coolant temperature is lower than the temperature threshold value.

The fuel cell and the secondary battery which are used as a power source of a traveling motor are generally started at the same time. Therefore, when the temperature of the coolant (the coolant temperature) passed through the fuel cell is low, there is a high likelihood that the temperature of the secondary battery will be low. In this case, the controller of the fuel-cell vehicle disclosed in this specification switches the switching valve to the bypass flow passage side and causes the coolant to flow into the secondary battery to increase the temperature of the secondary battery. On the other hand, when the coolant temperature is high, there is a high likelihood that the temperature of the secondary battery will also be high and thus the controller switches the switching valve to the radiator side such that the coolant of the cooling system for the fuel cell is not guided to the secondary battery. The coolant with a high temperature is cooled by the radiator. It is possible to increase the temperature of the secondary battery even when the ignition switch is in the ON state through the above-mentioned process flow of the controller.

The controller may be configured to perform the following process flow instead of the above-mentioned process flow. The controller switches the switching valve to the bypass flow passage when the coolant temperature is lower than a predetermined temperature threshold value and the coolant temperature is higher than the temperature of the secondary battery, and switches the switching valve to the radiator side otherwise. The temperature threshold value is typically an overheat protection temperature of the secondary battery. The overheat protection temperature is a temperature at or above which the performance of the secondary battery decreases. It is possible to adjust the temperature of the secondary battery to an appropriate temperature by guiding the coolant to the bypass flow passage (the secondary battery) when the coolant temperature is lower than the temperature threshold value and the coolant temperature is higher than the temperature of the secondary battery.

While specific examples of the embodiments have been described above in detail, these examples are merely exemplary and do not limit the appended claims. The techniques described in the claims include various modifications and alterations of the above-mentioned specific examples. The technical factors described in this specification or illustrated in the drawings exhibit technical usefulness alone or in various combinations thereof, and are not limited to the combinations described in the claims at the time of filing. The techniques described in this specification or illustrated in the drawings can simultaneously achieve a plurality of objectives and also have technical usefulness by achieving only one objective

What is claimed is:

1. A fuel-cell vehicle comprising:
a fuel cell;
a secondary battery;
a radiator;
a circulation flow passage configured to cause a coolant to circulate between the fuel cell and the radiator;
a bypass flow passage passing through the secondary battery, one end of the bypass flow passage being connected to the circulation flow passage on an upstream side of the radiator and the other end of the bypass flow passage being connected to the circulation flow passage on a downstream side of the radiator;
a switching valve configured to switch a direction in which the coolant flows between a radiator side and a bypass flow passage side, the switching valve being provided at a junction between the circulation flow passage and the bypass flow passage on an upstream side of the radiator;
a first temperature sensor configured to measure a coolant temperature, the coolant temperature being a temperature of a coolant passed through the fuel cell;
a second temperature sensor configured to measure a secondary battery temperature, the secondary battery temperature being the temperature of the secondary battery; and
a controller configured to switch the switching valve to the bypass flow passage side when the coolant temperature is lower than a predetermined temperature threshold value and the coolant temperature is higher than the secondary battery temperature, and
wherein when the coolant temperature is not lower than the predetermined temperature threshold value and the coolant temperature is not higher than the secondary battery temperature, the controller being configured to switch the switching valve to the radiator side.

\* \* \* \* \*